(No Model.)
A. G. POWELL.
STEERING BAR FOR BICYCLES.
No. 306,280. Patented Oct. 7, 1884.
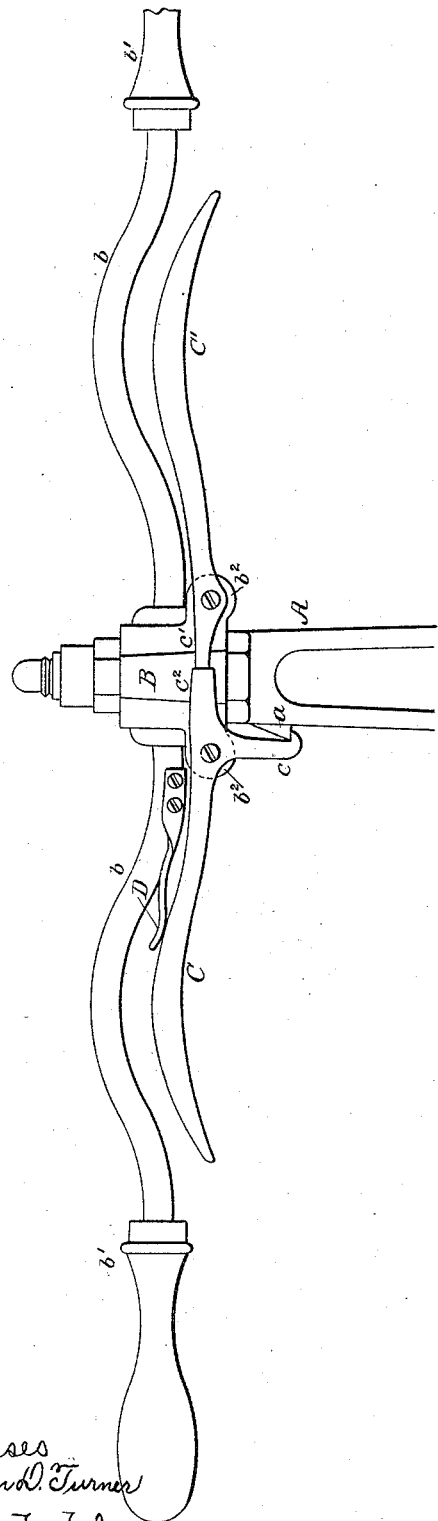
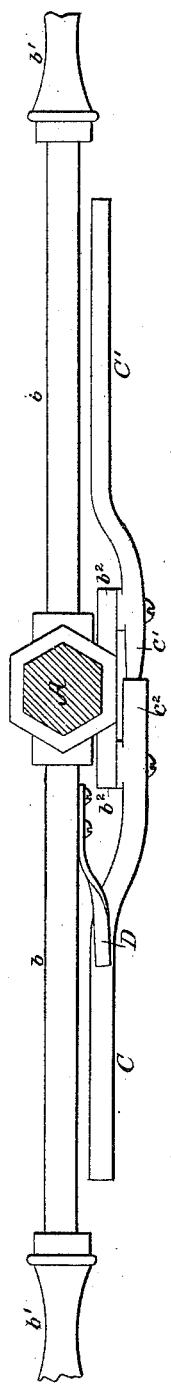
Witnesses
Hamilton D. Turner
James F. Jobin
Inventor
Abram G. Powell.
by his Attorneys
Howson and Sons

UNITED STATES PATENT OFFICE.

ABRAM G. POWELL, OF PHILADELPHIA, PENNSYLVANIA, ASSIGNOR TO THE PENNSYLVANIA SAFETY BICYCLE AND MANUFACTURING COMPANY, OF SAME PLACE.

STEERING-BAR FOR BICYCLES.

SPECIFICATION forming part of Letters Patent No. 306,280, dated October 7, 1884.

Application filed September 7, 1881. Renewed June 26, 1884. (No model.)

*To all whom it may concern:*

Be it known that I, ABRAM G. POWELL, a citizen of the United States, and a resident of Philadelphia, Pennsylvania, have invented certain new and useful Improvements in Detachable Steering-Bars for Bicycles; and I do hereby declare the following to be a full, clear, and exact description of the invention, reference being had to the accompanying drawings, which form part of this specification, and in which—

Figure 1 is a side elevation of my improved detachable steering-bar, and Fig. 2 a plan view of the same.

My invention relates to detachable handles for bicycles; and it consists, essentially, in the combination, with such handles and with the head on which the same are mounted, of a locking device so constructed as to hold said handles securely in place until a fall or "header" occurs, when a disengagement of the locking device and a release of said handles are effected, all as hereinafter more fully specified.

My invention is a modification of the principle shown in W. Rennyson's patent, No. 244,931, dated July 26, 1881.

A represents the steering-yoke of a bicycle, and B a collar which fits thereon and turns therewith. Integral with said collar, or rigidly secured thereto, are handles $b\ b$, whose extremities form hand-pieces $b'\ b'$. The collar and handles form the steering-bar, which is detachably fitted on the yoke, so as to be readily released therefrom when the bicycle rider "takes a header." The collar B is formed with lugs $b^2\ b^2$, on which are pivoted levers C C'. The yoke A has also a lug, $a$, with which an arm, $c$, of the lever C engages. The short arm $c^2$ of the lever C engages with the end of the arm $c'$ of the lever C', as shown, so that an upward motion of either of said levers will effect the disengagement of the arm $c$ from the lug $a$.

D represents a spring between the lever C and steering-bar or handle, the tendency of which is to press down said lever and maintain the arm $c$ in engagement with the lug $a$.

When a header is taken, the legs (either or both) of the rider come in contact with one or both of the interlocking levers, thereby releasing the arm $c$ from the lug $a$ and allowing the handle or steering bar to leave the yoke-head, thus permitting the rider to land on his feet without injury.

The means employed for locking the steering-bar to the yoke-head are, however, immaterial to my invention, and may be modified as desired without departing from the main feature of the invention, which is the providing of the detachable handle-bar with projecting arms to be struck by the legs of the rider as he is thrown from his seat, these arms controlling the locking device.

In the patent of Rennyson hereinbefore alluded to, a yielding or detachable handle-bar is shown and broadly claimed; and while my invention is similar to that of Rennyson as regards this broad feature, it differs from it in this respect, that while in my bicycle the handle-bar is normally locked to the head, and is only released from the latter when the rider is thrown from his seat, in the device as shown by Rennyson the handle-bar is normally unlocked, special devices being shown for locking the handle-bar to the steering-yoke.

I claim as my invention—

1. The combination of the steering-yoke of a bicycle and its handle-bar with a device whereby said handle-bar is normally locked to the head, and with projecting arms, which, when the rider is thrown from his seat, are struck and caused to unlock the handle-bar from the yoke.

2. A bicycle handle or steering bar having interlocking levers for securing the same to the steering-yoke and permitting its release, substantially as described.

3. The combination of the steering-yoke A of a bicycle, having a lug, $a$, with a handle or steering bar having interlocking levers C C', one of said levers having an arm, $c$, which engages with said lug $a$, the parts being so constructed that an upward movement of either lever will effect the release of the arm $c$ from the lug, as set forth.

4. The combination of the yoke A, having a lug, $a$, the collar B, having handle-arms $b$ $b$ and lugs $b^2 b^2$, the levers C C', and the spring D, all substantially as described.

In testimony that I claim the foregoing I have hereunto set my hand this 27th day of August, 1881.

ABM. G. POWELL.

Witnesses:
  E. D. McLOUGHLIN,
  S. J. VAN STAVOREN.